US012767183B2

(12) United States Patent
Ewert

(10) Patent No.: US 12,767,183 B2
(45) Date of Patent: Oct. 20, 2026

(54) METHOD AND APPARATUS FOR OPERATING AN AUTOMATED VEHICLE

(71) Applicant: Robert Bosch GmbH, Stuttgart (DE)

(72) Inventor: Marlon Ramon Ewert, Untergruppenbach (DE)

(73) Assignee: Robert Bosch GmbH, Stuttgart (DE)

(*) Notice: Subject to any disclaimer, the term of this patent is extended or adjusted under 35 U.S.C. 154(b) by 247 days.

(21) Appl. No.: 18/189,484

(22) Filed: Mar. 24, 2023

(65) Prior Publication Data

US 2023/0382428 A1 Nov. 30, 2023

(30) Foreign Application Priority Data

May 24, 2022 (DE) ..................... 10 2022 205 168.8

(51) Int. Cl.
*B60W 60/00* (2020.01)

(52) U.S. Cl.
CPC . *B60W 60/0027* (2020.02); *B60W 2554/4026* (2020.02); *B60W 2554/4029* (2020.02); *B60W 2554/4046* (2020.02)

(58) Field of Classification Search
CPC ..... B60W 60/0027; B60W 2554/4026; B60W 2554/4029; B60W 2554/4046
See application file for complete search history.

(56) References Cited

U.S. PATENT DOCUMENTS 8,982,669 B2 * 3/2015 Barthel ................... G01S 7/412 367/99
11,034,364 B1 * 6/2021 Narang .................. G06N 3/006
(Continued)

FOREIGN PATENT DOCUMENTS

DE 102014217847 A1 3/2016
DE 102014223363 A1 5/2016
(Continued)

OTHER PUBLICATIONS

Surface Vehicle Recommended Practice, "Taxonomy and Definitions for Terms Related to Driving Automation System for On-Road Motor Vehicles," SAE International, SAE Standard J3016, 2018, pp. 1-35.

*Primary Examiner* — Kito R Robinson

(74) *Attorney, Agent, or Firm* — Norton Rose Fulbright US LLP

(57) ABSTRACT

A method and apparatus for operating an automated vehicle. The method includes: acquiring environmental data values which represent objects in an environment of the automated vehicle; determining a position of the automated vehicle; comparing the environmental data values with a digital map, depending on the position of the automated vehicle, the digital map including environmental features, a first subset of the objects being determined as static objects when these objects are comprised as environmental features in the digital map, and a second subset of the objects are determined as non-static objects, when these objects are not comprised as an environmental feature in the digital map; determining a motion behavior of the non-static objects relative to the automated vehicle; determining a travel strategy for the automated vehicle, depending on the motion behavior of the non-static objects; and operating the automated vehicle, depending on the travel strategy.

13 Claims, 2 Drawing Sheets

(56) References Cited

U.S. PATENT DOCUMENTS

| | | | | |
|---|---|---|---|---|
| 2017/0158193 | A1* | 6/2017 | Lopez | B60W 60/0027 |
| 2020/0249354 | A1* | 8/2020 | Yeruhami | G01S 7/4815 |
| 2021/0061099 | A1* | 3/2021 | Terai | B60W 30/18027 |
| 2021/0188247 | A1* | 6/2021 | Nakayama | B60L 50/16 |
| 2021/0284200 | A1* | 9/2021 | Liu | G05D 1/0077 |
| 2021/0387632 | A1* | 12/2021 | Sugawara | B60W 50/023 |
| 2022/0082655 | A1* | 3/2022 | Gao | G01S 7/023 |
| 2022/0227391 | A1* | 7/2022 | Wang | B60W 40/04 |

FOREIGN PATENT DOCUMENTS

| | | | | |
|---|---|---|---|---|
| DE | 102018208182 | A1 | 11/2019 | |
| DE | 102018121165 | A1 | 3/2020 | |
| DE | 102019119095 | A1 | 1/2021 | |
| WO | WO-2020216658 | A1 * | 10/2020 | B60W 40/04 |

* cited by examiner

METHOD AND APPARATUS FOR OPERATING AN AUTOMATED VEHICLE

CROSS REFERENCE

The present application claims the benefit under 35 U.S.C. § 119 of German Patent Application No. DE 10 2022 205 168.8 filed on May 24, 2022, which is expressly incorporated herein by reference in its entirety.

FIELD

The present invention relates, among other things, to a method of operating an automated vehicle with a step of comparing environmental data values with a digital map depending on a position of the automated vehicle, wherein both static and non-static objects are determined depending on the comparison. Further, depending on a motion behavior of the non-static objects, a travel strategy for the automated vehicle is determined such that the automated vehicle is operated depending on the travel strategy.

SUMMARY

A method according to an example embodiment of the present invention for operating an automated vehicle comprises a step of acquiring environmental data values by means of an environmental sensor system of the automated vehicle, wherein the environmental data values represent objects in an environment of the automated vehicle, a step of determining a position of the automated vehicle and a step of comparing the environmental data values with a digital map, depending on the position of the automated vehicle, wherein the digital map comprises environmental features, wherein a first subset of the objects are determined as static objects, when these objects are encompassed as environmental features by the digital map, and a second subset of the objects are determined as non-static objects, when these objects are not encompassed by the digital map as an environmental feature. The method further includes a step of determining a motion behavior of the non-static objects relative to the automated vehicle, a step of determining a travel strategy for the automated vehicle depending on the motion behavior of the non-static objects, and a step of operating the automated vehicle depending on the travel strategy.

An automated vehicle is understood to mean a partially automated, highly automated, or fully automated vehicle in accordance with one of SAE levels 1 to 5 (see the SAE J3016 standard).

Operating an automated vehicle, in particular depending on the travel strategy, is understood to mean, e.g., performing lateral and/or longitudinal control of the automated vehicle, the lateral and/or longitudinal control occurring such that the automated vehicle moves along the trajectory. In one possible embodiment, the operation also comprises, e.g., performing safety-relevant functions ("arming" an airbag, locking the seatbelts, etc.) and/or further (driving assistance) functions.

An environmental sensor system is to be understood to include at least one video and/or at least one radar and/or at least one lidar and/or at least one ultrasonic and/or at least one further sensor configured to record an environment of a vehicle in the form of environmental data values. In a possible embodiment, for example, the environmental sensor system comprises a computing unit (processor, memory, hard drive) with suitable software and/or is connected to such a computing unit. In a possible embodiment, for example, this software comprises object detection algorithms that are based on a neural network or artificial intelligence.

For example, a static object is to be understood here as an object that does not move at least currently. These can be, for example, traffic signs (road signs, traffic lights, etc.), infrastructure features (guard rails, bridge pillars, lane barriers, etc.), parked vehicles, garbage can on the roadsides, buildings, etc.

A dynamic object is to be understood here, for example, as an object that is currently moving. These can be, for example, other vehicles, pedestrians, bicyclists, etc.

For example, a motion behavior of the non-static objects relative to the automated vehicle is to be understood as whether that object is moving away from the automated vehicle or towards the automated vehicle, etc. In one embodiment, the motion behavior particularly comprises whether the movement of this object poses a risk to the automated vehicle (for example, in that this object approaches such that a collision is impending, etc.).

A digital map is understood to mean a map in the form of (map) data values on a storage medium. For example, this map is configured to encompass one or multiple map layers, wherein a map layer shows e.g. a map from a bird's eye view (course and position of roads, buildings, landscape features, etc.). This corresponds to, e.g., a map of a navigation system. Another map layer includes, e.g., a radar map, wherein environmental features encompassed by the radar map are stored along with a radar signature. A further map layer comprises, e.g., a lidar map, wherein the environmental features encompassed by the lidar map are stored along with a lidar signature.

The method according to the present invention may advantageously achieve an objective of providing a method for efficiently detecting moving objects in an environment of an automated vehicle and thus also a safe operation of this automated vehicle. This objective is achieved by means of the method according to the present invention, inter alia, by capturing objects in the environment and comparing them to a digital map. Using as few resources or computational capacities as possible, this makes it possible to distinguish static from non-static objects. In this way, sufficient computing capacity is used in the automated vehicle for critical dynamic objects, for example, for locating, trajectory planning, and actuator control, which in this case occurs in a highly accurate and safe manner. Non-critical static objects are considered with as few resources as possible in trajectory planning, localization and actuator control.

Preferably, the digital map is configured as a highly accurate map, which comprises the environmental features with a highly accurate position.

The highly accurate map is in particular configured to be suitable for the navigation of an automated vehicle. For example, this is understood to mean that the highly accurate map is configured to determine a highly accurate position of this automated vehicle by comparing stored environmental features with sensed sensor data values of the automated vehicle. To this end, the highly accurate map includes, e.g., these environmental features with highly accurate location information (coordinates).

A highly accurate position is understood to mean a position that is accurate within a predetermined coordinate system, for example WGS84 coordinates, to such a degree that this position does not exceed a maximum allowable uncertainty. The maximum uncertainty can depend on the environment, for example.

Furthermore, the maximum uncertainty can depend, for example, on whether a vehicle is operated manually or in a partially, highly or fully automated manner (corresponding to one of SAE levels 1-In principle, the maximum uncertainty is so low that in particular a safe operation of the automated vehicle is ensured. For a fully automated operation of the automated vehicle, for example, the maximum uncertainty is in an order of magnitude of about 10 centimeters.

Preferably, the position of the automated vehicle comprises both a position indication in a predetermined coordinate system and a pose of the automated vehicle.

A pose of the automated vehicle is to be understood as a spatial position in a coordinate system, which includes, for example, pitch angle, tilt angle and roll angle—in relation to the axes of the coordinate system.

Preferably, the motion behavior comprises at least whether the non-static objects are moving or not moving in the environment of the automated vehicle.

Preferably, the travel strategy comprises a trajectory for the automated vehicle and the operation comprises driving along this trajectory.

A trajectory is understood to mean for example—in relation to a map—a line that the automated vehicle follows. In one embodiment, this line refers to, e.g., a fixed point on the automated vehicle. In a further possible embodiment, a trajectory is understood to mean, e.g., a travel route envelope through which the automated vehicle travels.

In one example embodiment of the present invention, the travel strategy additionally comprises an indication of a speed with which the automated vehicle is to move along the trajectory.

The apparatus according to the present invention, in particular a control unit, is configured to perform all of the method steps according to one of the method(s) for operating an automated vehicle disclosed herein.

For this purpose, according to an example embodiment of the present invention, the apparatus comprises a computing unit in particular (processor, memory, storage medium), as well as suitable software for performing the method(s) of the present invention disclosed herein. Furthermore, the device comprises an interface for transmitting and receiving data values via a wired and/or wireless connection, for example with further devices of the vehicle (control units, communication devices, environmental sensor system, navigation system, etc.) and/or external devices (server, cloud, etc.).

Also provided according to an example embodiment of the present invention is a computer program comprising instructions which, when the computer program is executed by a computer, prompt the computer to perform a method according to one of the method(s) of the present invention disclosed herein used for operating an automated vehicle. In one embodiment, the computer program corresponds to the software comprised by the apparatus.

Also provided according to an example embodiment of the present invention is a machine-readable storage medium, on which the computer program is stored.

Advantageous further developments of the present invention are disclosed herein and explained in the description.

BRIEF DESCRIPTION OF THE DRAWINGS

Embodiment examples of the present invention are illustrated in the figures and are explained in more detail in the following description.

DETAILED DESCRIPTION OF EXAMPLE EMBODIMENTS

Figure 1:
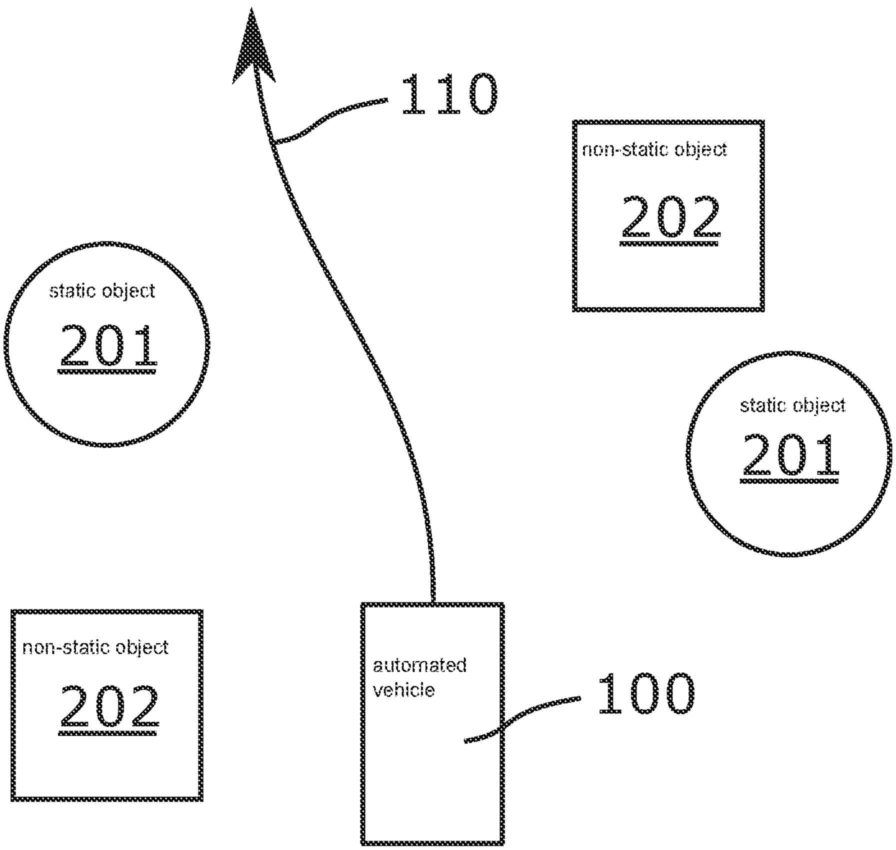
FIG. 1 shows an embodiment example of the method according to the present invention for operating an automated vehicle.

FIG. 1 shows a possible embodiment example of the method 300 according to the present invention for operating an automated vehicle 100 moving along a trajectory 110. The environment of the automated vehicle 100 includes both static objects 201 and non-static objects 202. The following explanations are made purely by way of example with reference to a video sensor, the environmental data values thus corresponding to image data or images.

In a possible embodiment, an object detection algorithm of the environmental sensor system or a downstream processing unit is adapted to allow this algorithm to distinguish static objects 201 from non-static objects 202. For this purpose, for example, a position and/or a pose of the automated vehicle 100 are determined using a digital map. This is done, for example, by localization on the basis of GNSS, Car-2-X signal transit time, or environmental sensor systems. After the position and/or pose are determined in the digital map, the object detection algorithm first identifies areas that are congruent with the static objects 201 of the digital map. In doing so, the position and/or pose of the automated vehicle 100 relative to the expected static objects encompassed by the digital map is taken into account as well. For this purpose, for example, the static structures of the digital map that are expected to be visible at this vehicle position are transformed into a coordinate system of the environmental sensor system. Subsequently, a comparison between the transformed static structures of the digital map, depending on the position and/or pose, with the environmental data values is performed using the object detection algorithm. As a result, image areas are obtained in the environmental data values that correspond to the static structures of the digital map. For example, these image areas are marked as static structures in the image data.

In a next step, these image areas, which are not congruent with the digital map, are marked as potential candidates for the non-static objects 202. In these imaging areas of the environmental sensor system, the non-static objects 202 are then determined in a targeted manner using the object detection algorithm. For this purpose, for example, the image flow of these image areas of the potentially non-static objects 202 is also taken into account via multiple images of environmental sensor system. For example, it is analyzed whether the image area of the potentially non-static objects 202 is moving in a particular direction within the environmental data values, or whether the positions of the potentially non-static objects 202 are moving uniformly relative to the automated vehicle 100.

For example, if the potentially non-static objects 202 move in a particular direction, the position within the environmental data values as well as the accordingly transformed positions of these objects 202 relative to the automated vehicle 100 will change over time. This is detected using the object detection algorithm. In the environmental data values, the static domains that are congruent with the digital map are discarded for of the purpose of considering the non-static objects 202 and only the image areas of the potentially non-static objects 202 are evaluated.

However, if the potentially non-static objects 202 do not move in a particular direction, it is, for example, a parked vehicle. This is detected using the proposed object detection algorithm. The corresponding object is then marked as static, for example, and is not further considered as a non-static object 202. Thus, for example, parked vehicles, i.e. only temporarily static objects, are not evaluated or considered further.

For example, in another embodiment, the motion detection of objects 201, 202 is decoupled from actual object detection. It means that a first intelligent algorithm, for example of an artificial intelligence and/or a neural network, is first used to perform a comparison between the digital map and the environmental data values, thereby determining image areas of static objects 201 and potentially non-static objects 202. Subsequently, in the same or in a downstream algorithm, the detection of the movement of the potential non-static objects 202 is performed by an evaluation of multiple environmental data values, which are recorded at different time points. Further, a highly accurate object detection algorithm is used to perform the highly accurate evaluation of the non-static objects 202 in the marked image areas of the first algorithm.

For example, in another embodiment, an object detection of the static objects 201 and of the non-static objects 202 is performed in a separate manner. For example, a rather slow object detection algorithm is used for the static objects 201, or the map data are used directly after the comparison with the digital map. Another, rather faster, object detection algorithm is executed in parallel for the potential non-static objects 202.

In another embodiment, it may be the case for example that there are no image areas that include potential non-static objects 202. Here, the algorithm for the highly accurate detection of the non-static objects 202 can be placed in a type of sleep mode, thereby conserving valuable resources of the automated vehicle. The simple object detection algorithm for the static objects 201 continues to execute until again potential non-static objects 202 can be determined in the environmental data values that cannot be matched to the digital map or that move over time. Then, the corresponding highly accurate algorithm can be awakened from the sleep mode. In this way, valuable computing capacities of the automated vehicle 100 are conserved and released only when needed.

In a further embodiment, for example, the environmental sensor system of the automated vehicle 100 includes so-called main sensors and associated redundant sensors. The environmental data values of the main sensors are used in this embodiment to categorize the corresponding image areas into static image areas and image areas with non-static objects 202 using the downstream algorithm or algorithms. In this case, the redundant sensors are temporarily not used and are actively engaged only when potentially non-static objects 202 are determined in the environmental data values of the main sensors. The image areas with these potentially non-static objects 202 are subsequently determined highly accurately by the main sensors and by means of the associated redundant sensors, and a position of these objects relative to the automated vehicle 100 is determined and/or tracked over time. Thus, resources of the automated vehicle 100 can also be conserved by using the redundant sensors only when non-static objects 202 are encompassed by the environment of the automated vehicle 100.

For example, in another embodiment, the redundant sensors are only used or actively engaged if a highly accurate detection of the potentially non-static objects 202 in the environmental data values recorded by the main sensors is not clear or is not possible with a specified accuracy. In this case, the redundant sensors can be used to improve the accuracy of the detection of the potentially non-static objects 202 relative to the automated vehicle 100.

Figure 2:
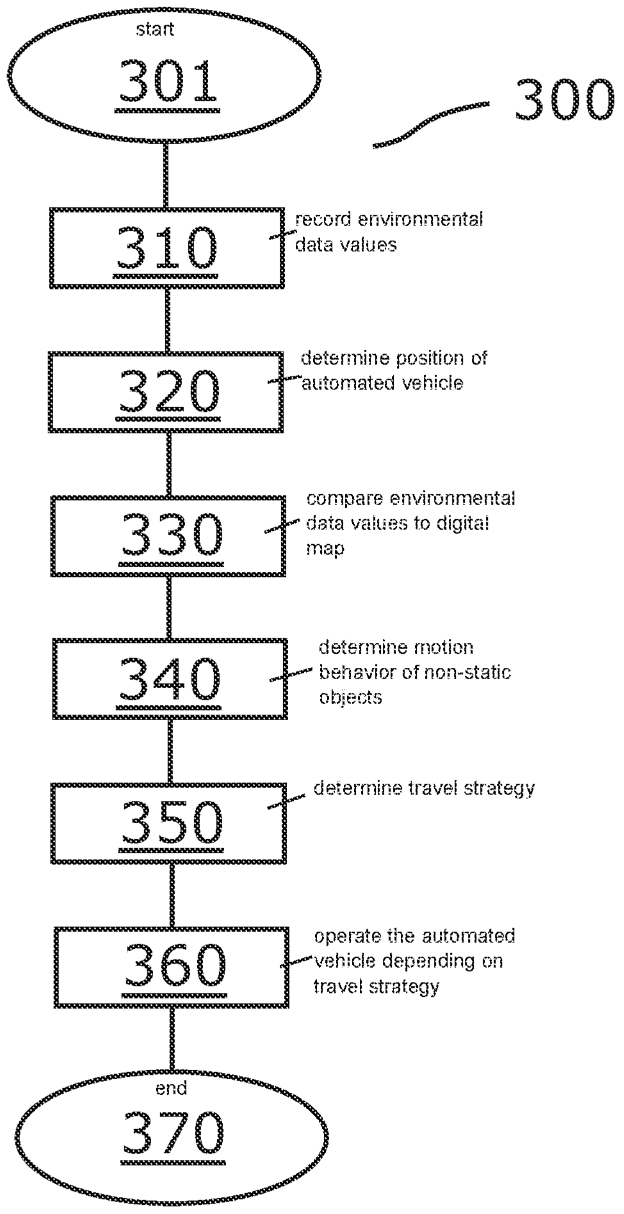
FIG. 2 shows an embodiment example of the method according to the present invention for operating an automated vehicle in the form of a flow chart.

FIG. 2 shows a possible embodiment example of a method 300 for operating an automated vehicle 100.

The method 300 starts at step 301.

In step 310, environmental data values are recorded using an environmental sensor system of the automated vehicle 100, wherein the environmental data values represent objects in an environment of the automated vehicle 100.

In step 320, a position of the automated vehicle 100 is determined.

In step 330, the environmental data values are compared to a digital map depending on the position of the automated vehicle 100, wherein the digital map includes environmental features, wherein a first subset of the objects 201, 202 are determined as static objects 201 when those objects 201 are encompassed as environmental features by the digital map, and a second subset of the objects 201, 202 are determined to be non-static objects 202 when these objects 202 are not encompassed as an environmental feature by the digital map.

In step 340, a motion behavior of the non-static objects 202 relative to the automated vehicle 100 is determined.

In step 350, a travel strategy for the automated vehicle 100 is determined depending on the motion behavior of the non-static objects 202.

In step 360, the automated vehicle 100 is operated depending on the travel strategy.

The method 300 ends at step 370.

What is claimed is:

1. A method of operating an automated vehicle, comprising the following steps:

acquiring environmental data values using an environmental sensor system of the automated vehicle, wherein the environmental data values represent objects in an environment of the automated vehicle, wherein the environmental sensor system includes a plurality of main sensors and a plurality of redundant sensors, wherein the redundant sensors are initialized in a resource-conserving mode, wherein the environmental data values acquired using the environmental sensor system are acquired using the plurality of main sensors;

determining a position of the automated vehicle;

comparing the environmental data values with a digital map, depending on the determined position of the automated vehicle, wherein the digital map includes environmental features, wherein a first subset of the objects are determined as static objects, when the objects are included as environmental features in the digital map, and a second subset of the objects are determined as dynamic objects, when the objects are not included as environmental features in the digital map;

determining whether the environmental data values acquired using the plurality of main sensors include one or more environmental data values corresponding to the second subset of objects and have an accuracy less than or equal to a threshold;

activating, in response to determining the environmental data values acquired by the plurality of main sensors include one or more environmental data values corresponding to the second subset of objects and have an accuracy less than or equal to the threshold, the plurality of redundant sensors from the resource-conserving mode;

acquiring, by the plurality of main sensors and the plurality of redundant sensors after activating the plurality of redundant sensors, further environmental data values for the second subset of objects;

determining a motion behavior of the second subset of objects relative to the automated vehicle based on the further environmental data values;

determining a travel strategy for the automated vehicle depending on the determined motion behavior of the second subset of objects; and operating the automated vehicle depending on the travel strategy, the operating including performing at least one of a lateral and longitudinal control of the automated vehicle.

2. The method as recited in claim 1, wherein the digital map is configured as an accurate map, which includes the environmental features with an accurate position.

3. The method as recited in claim 1, wherein the determined position of the automated vehicle includes both a position indication in a predetermined coordinate system and a pose of the automated vehicle.

4. The method as recited in claim 1, wherein the motion behavior of the second subset of objects includes whether the second subset of objects in the environment of the automated vehicle are moving away from or towards the automated vehicle.

5. The method as recited in claim 1, wherein the travel strategy includes a trajectory for the automated vehicle and the operation includes driving along the trajectory.

6. The method as recited in claim 1, wherein the digital map includes one or more map layers, and wherein at least one of the one or more map layers includes a map from a bird's eye view, a map of a navigation system, a radar map, and/or a lidar map.

7. The method as recited in claim 1, wherein the operating the automated vehicle depending on the travel strategy further includes to perform one or more safety-relevant functions.

8. An apparatus, comprising:

a control unit configured to operate an automated vehicle, the control unit configured to:

acquire environmental data values using an environmental sensor system of the automated vehicle, wherein the environmental data values represent objects in an environment of the automated vehicle, wherein the environmental sensor system includes a plurality of main sensors and a plurality of redundant sensors, wherein the redundant sensors are initialized in a resource-conserving mode, wherein the environmental data values acquired using the environmental sensor system are acquired using the plurality of main sensors;

determine a position of the automated vehicle;

compare the environmental data values with a digital map, depending on the determined position of the automated vehicle, wherein the digital map includes environmental features, wherein a first subset of the objects are determined as static objects, when the objects are comprised as environmental features in the digital map, and a second subset of the objects are determined as dynamic objects, when these objects are not comprised as environmental feature in the digital map;

determine whether the environmental data values acquired using the plurality of main sensors include one or more environmental data values corresponding to the second subset of objects and have an accuracy less than or equal to a threshold;

activate, in response to determining the environmental data values acquired by the plurality of main sensors include one or more environmental data values corresponding to the second subset of objects and have an accuracy less than or equal to the threshold, the plurality of redundant sensors from the resource-conserving mode;

acquire, by the plurality of main sensors and the plurality of redundant sensors after activating the plurality of redundant sensors, further environmental data values for the second subset of objects;

determine a motion behavior of the second subset of objects relative to the automated vehicle based on the further environmental data values;

determine a travel strategy for the automated vehicle depending on the determined motion behavior of the second subset of objects; and operate the automated vehicle depending on the travel strategy, wherein to operate the automated vehicle includes to perform at least one of a lateral and longitudinal control of the automated vehicle.

9. The apparatus of claim 8, wherein the digital map includes one or more map layers, and wherein at least one of the one or more map layers includes a map from a bird's eye view, a map of a navigation system, a radar map, and/or a lidar map.

10. The apparatus of claim 8, wherein the control unit is further configured to perform one or more safety-relevant functions as part of to operate the automated vehicle depending on the travel strategy.

11. A non-transitory machine-readable storage medium on which is stored a computer program of operating an automated vehicle, the computer program, when executed by a computer, causing the computer to perform the following steps:

acquiring environmental data values using an environmental sensor system of the automated vehicle, wherein the environmental data values represent objects in an environment of the automated vehicle, wherein the environmental sensor system includes a plurality of main sensors and a plurality of redundant sensors, the redundant sensors being initialized in a resource-conserving mode, wherein the environmental data values acquired using the environmental sensor system are acquired using the plurality of main sensors;

determining a position of the automated vehicle;

comparing the environmental data values with a digital map, depending on the determined position of the automated vehicle, wherein the digital map includes environmental features, wherein a first subset of the objects are determined as static objects, when the objects are comprised as environmental features in the digital map, and a second subset of the objects are determined as dynamic objects, when these objects are not comprised as environmental features in the digital map;

determining whether the environmental data values acquired using the plurality of main sensors correspond to the second subset of objects and have an accuracy less than or equal to a threshold;

activating, in response to determining the environmental data values acquired by the plurality of main sensors include one or more environmental data values corresponding to the second subset of objects and have an accuracy less than or equal to the threshold, the plurality of redundant sensors from the resource-conserving mode;

acquiring, by the plurality of main sensors and the plurality of redundant sensors after activating the plurality of redundant sensors, further environmental data values for the second subset of objects;

determining a motion behavior of the second subset of objects relative to the automated vehicle based on the further environmental data values;

determining a travel strategy for the automated vehicle depending on the determined motion behavior of the second subset of objects; and operating the automated vehicle depending on the travel strategy, the operating including performing at least one of a lateral and longitudinal control of the automated vehicle.

12. The non-transitory machine-readable storage medium of claim 11, wherein the digital map includes one or more map layers, and wherein at least one of the one or more map layers includes a map from a bird's eye view, a map of a navigation system, a radar map, and/or a lidar map.

13. The non-transitory machine-readable storage medium of claim 11, wherein the operating the automated vehicle depending on the travel strategy further includes to perform one or more safety-relevant functions.

* * * * *